(12) United States Patent
Brown et al.

(10) Patent No.: US 7,997,295 B2
(45) Date of Patent: Aug. 16, 2011

(54) CONTROLLER, SYSTEM AND METHOD FOR PROVIDING SUPPLEMENTING WATER

(75) Inventors: Rodney James Brown, Carnegie (AU); Da-Wei Zhang, Doncaster (AU)

(73) Assignee: Davey Products Pty Ltd, Victoria (AU)

( * ) Notice: Subject to any disclaimer, the term of this patent is extended or adjusted under 35 U.S.C. 154(b) by 251 days.

(21) Appl. No.: 11/632,498

(22) PCT Filed: Jul. 22, 2005

(86) PCT No.: PCT/AU2005/001096
§ 371 (c)(1),
(2), (4) Date: Apr. 11, 2007

(87) PCT Pub. No.: WO2006/007669
PCT Pub. Date: Jan. 26, 2006

(65) Prior Publication Data
US 2008/0128025 A1    Jun. 5, 2008

(30) Foreign Application Priority Data
Jul. 22, 2004   (AU) ................................ 2004904071

(51) Int. Cl.
*F16K 31/122* (2006.01)
(52) U.S. Cl. ................... 137/102; 137/113; 137/606
(58) Field of Classification Search .............. 137/102, 137/109, 111, 112, 113, 602, 605, 606; 251/331
See application file for complete search history.

(56) References Cited

U.S. PATENT DOCUMENTS

| 3,224,455 A | 12/1965 | Alfieri |
| 3,592,215 A | 7/1971 | Davis |
| 4,480,653 A * | 11/1984 | Vanderburg ................. 137/112 |
| 5,127,426 A | 7/1992 | D'Archambaud et al. |

FOREIGN PATENT DOCUMENTS

| AU | 2003262296 B2 * | 5/2005 |
| DE | 1182968 A | 12/1964 |
| GB | 1488147 | 10/1977 |
| GB | 1488147 A | 10/1977 |

* cited by examiner

*Primary Examiner* — John Bastianelli
(74) *Attorney, Agent, or Firm* — Birch, Stewart, Kolasch & Birch, LLP

(57) ABSTRACT

A supplementing water supply controller which provides water from a supplementing water supply to an outlet in preference to a main water supply, wherein if there is insufficient supplementing water to meet demand, the main water supply flows through the controller to the outlet, whereas if there is sufficient supplemental water to meet the demand, a supplementing water pump is activated and the pressure of the supplementing water is raised above a threshold level at which it moves an actuator mounted by two diaphragms to block the main water supply, so that the supplementing water can flow to the outlet. The actuator has a larger effective area at its low pressure end than at its high pressure end, so that the supplementing water threshold pressure level for moving the actuator to block the main water supply is less than the main water pressure.

12 Claims, 10 Drawing Sheets

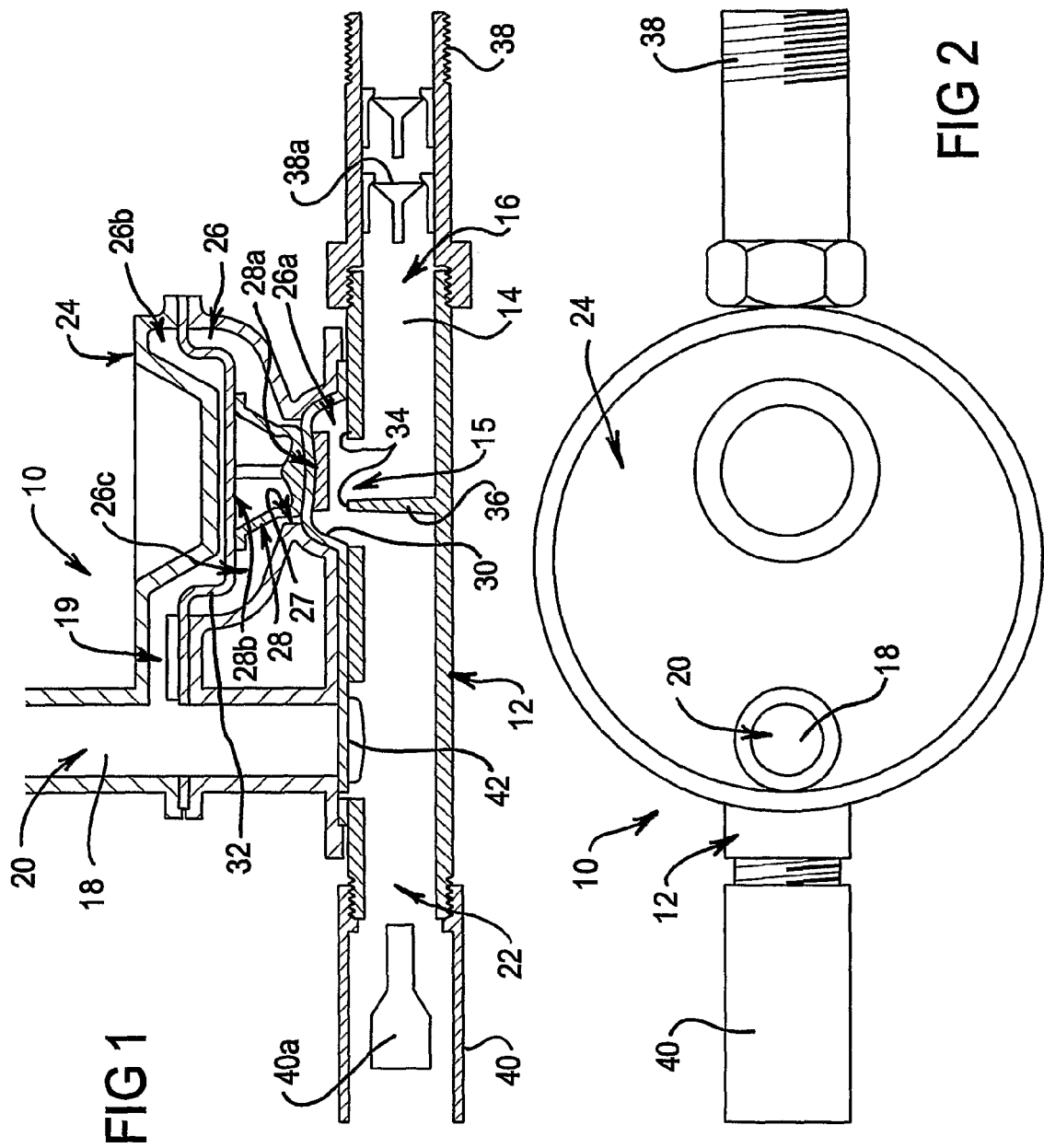

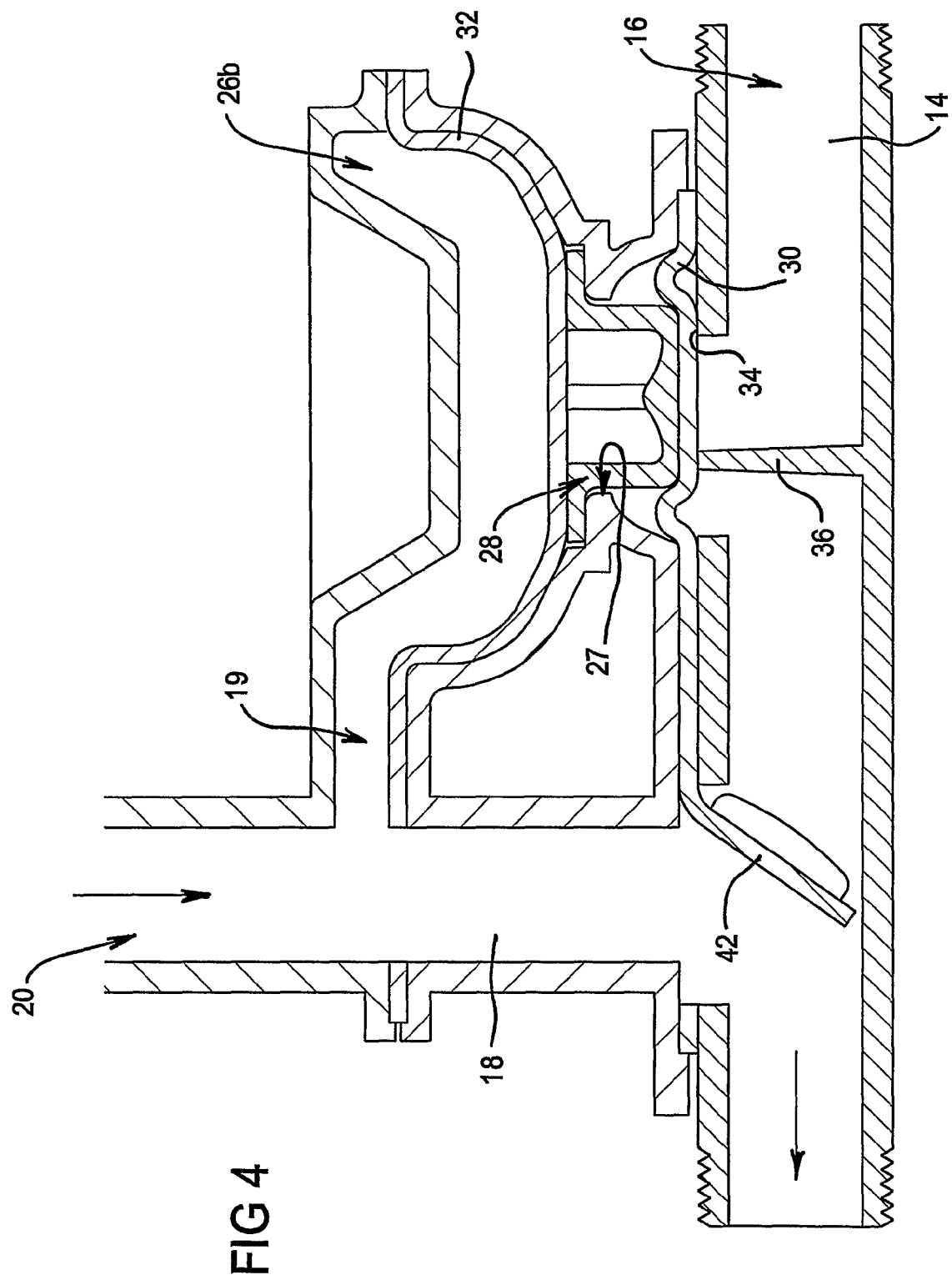

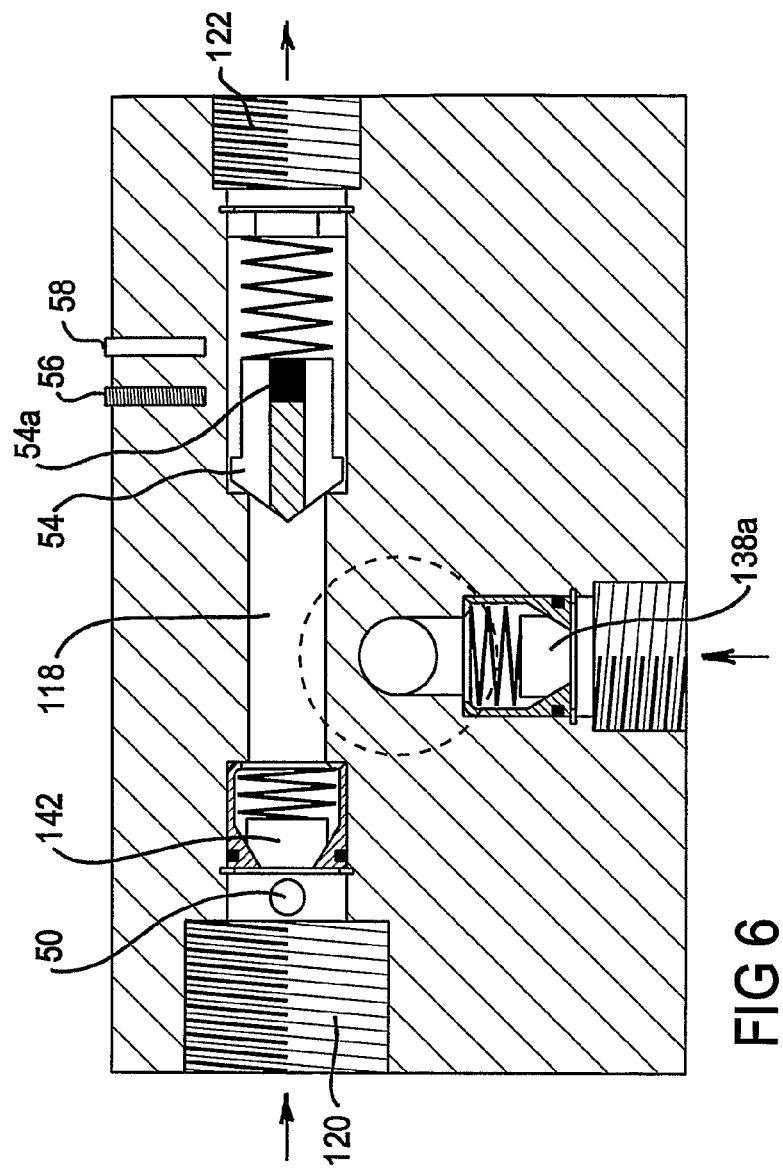
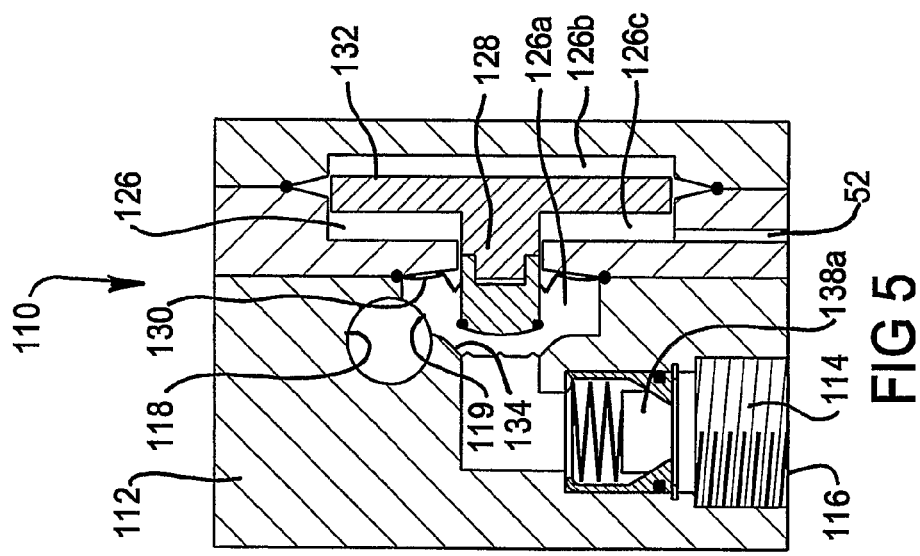

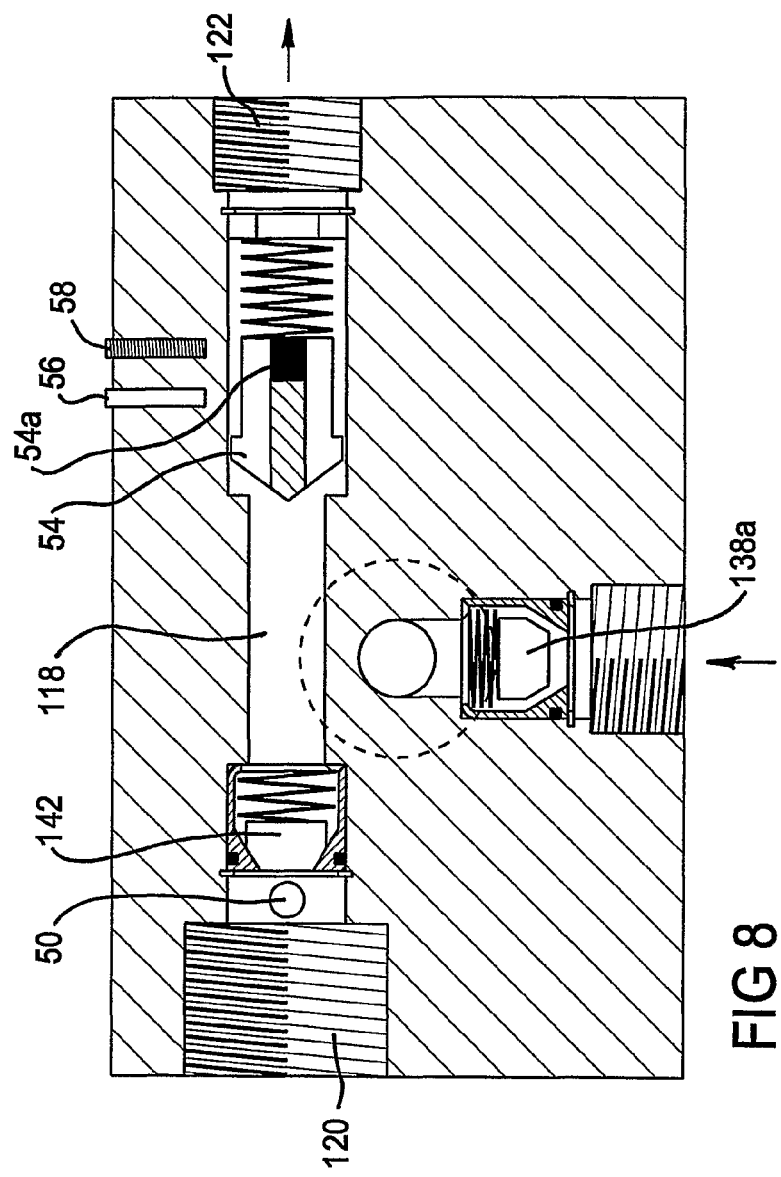
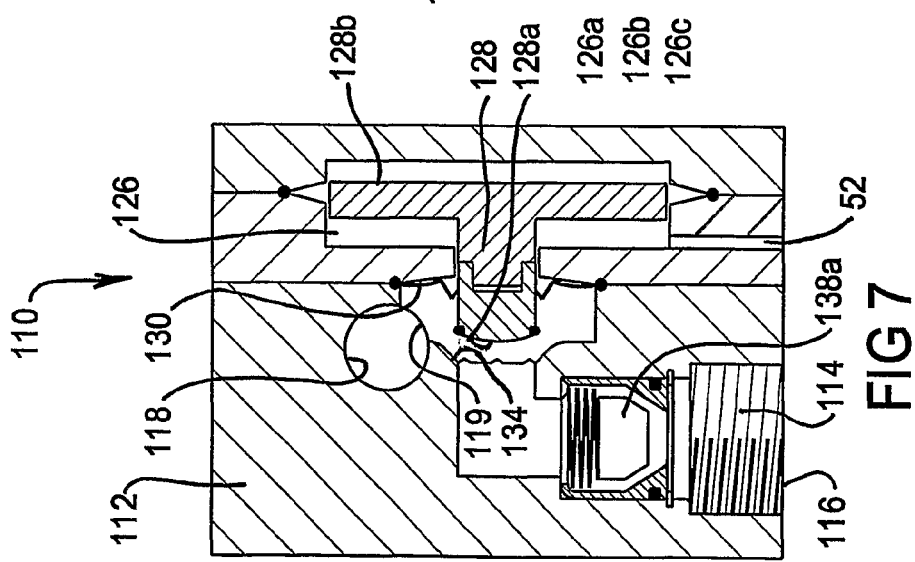

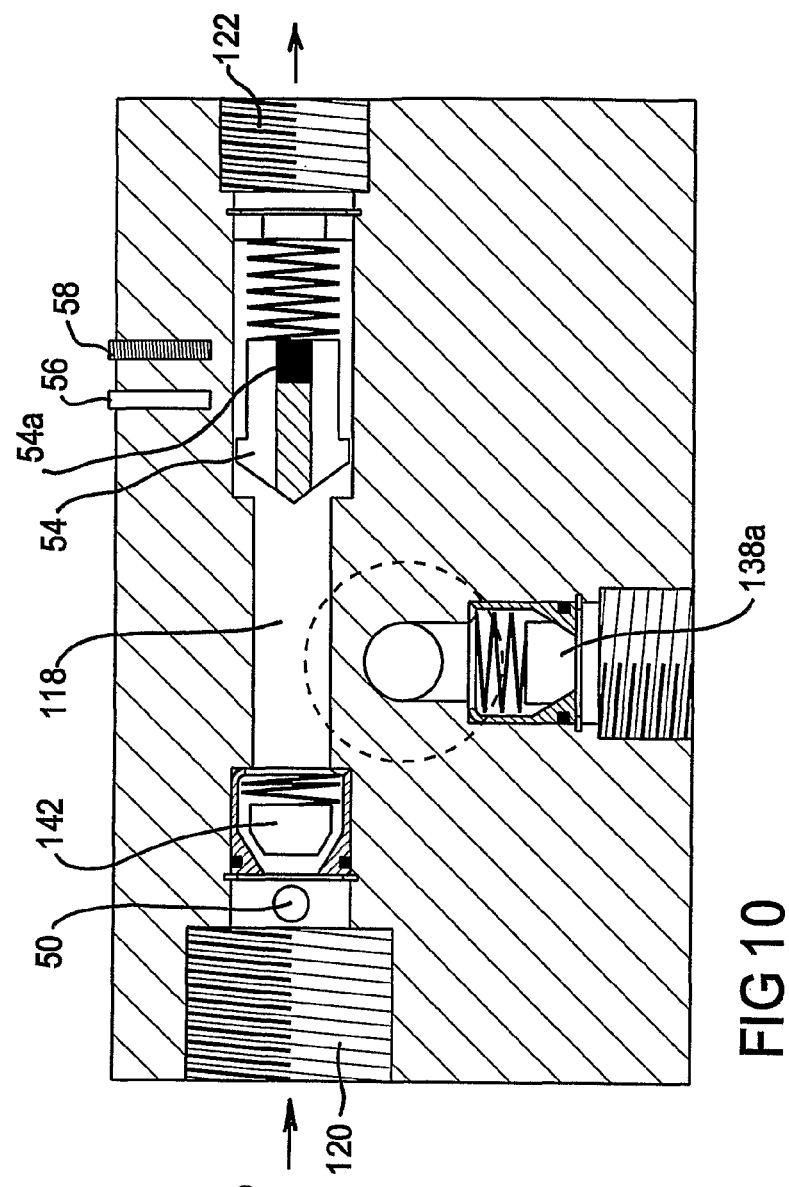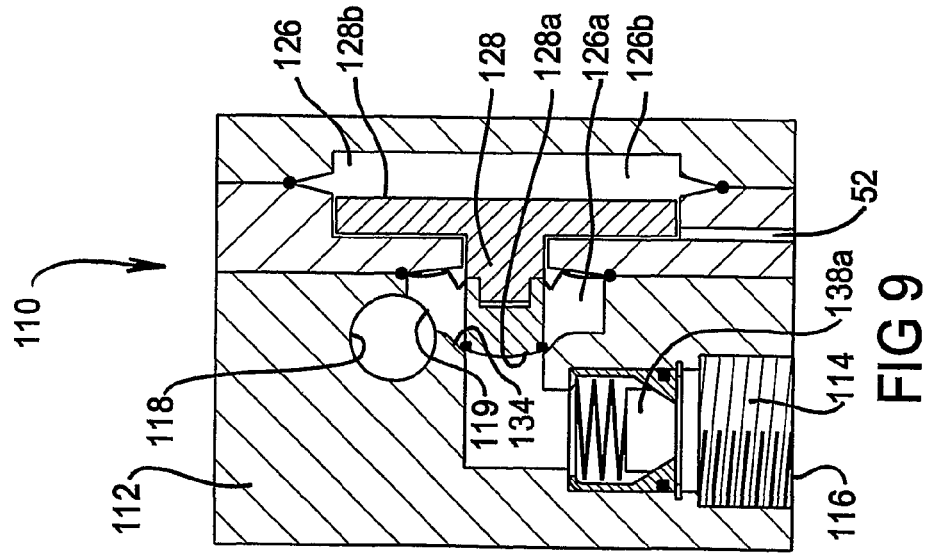

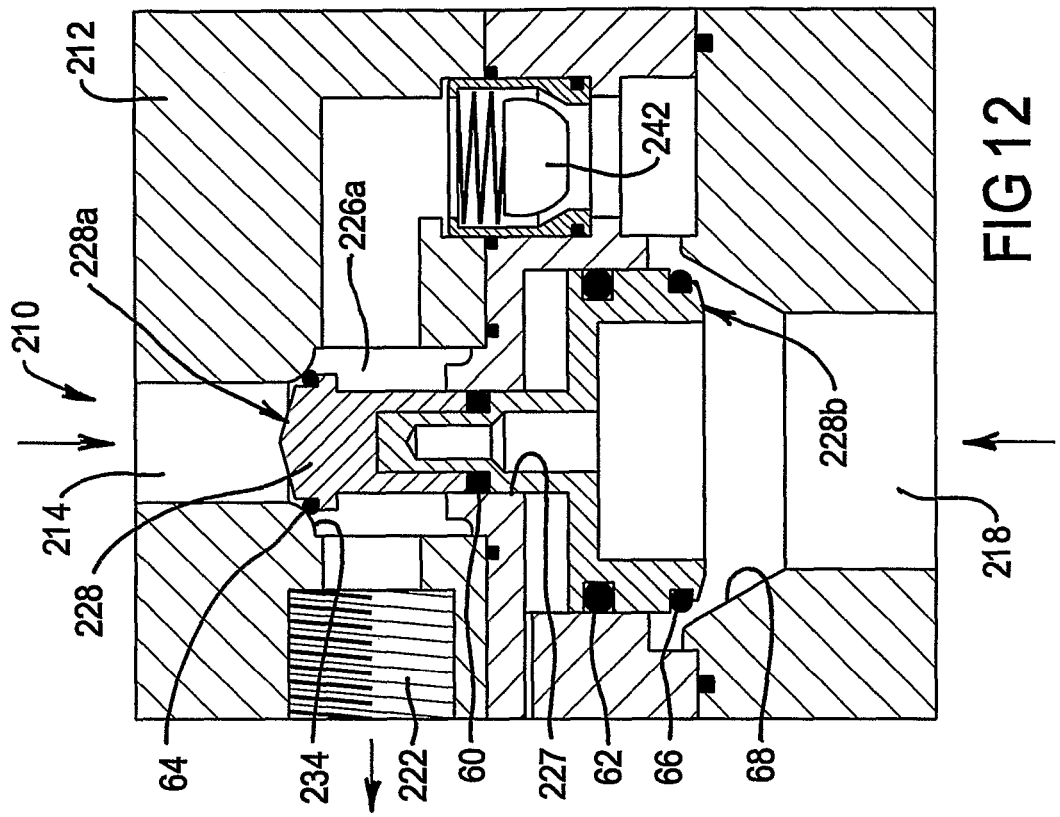
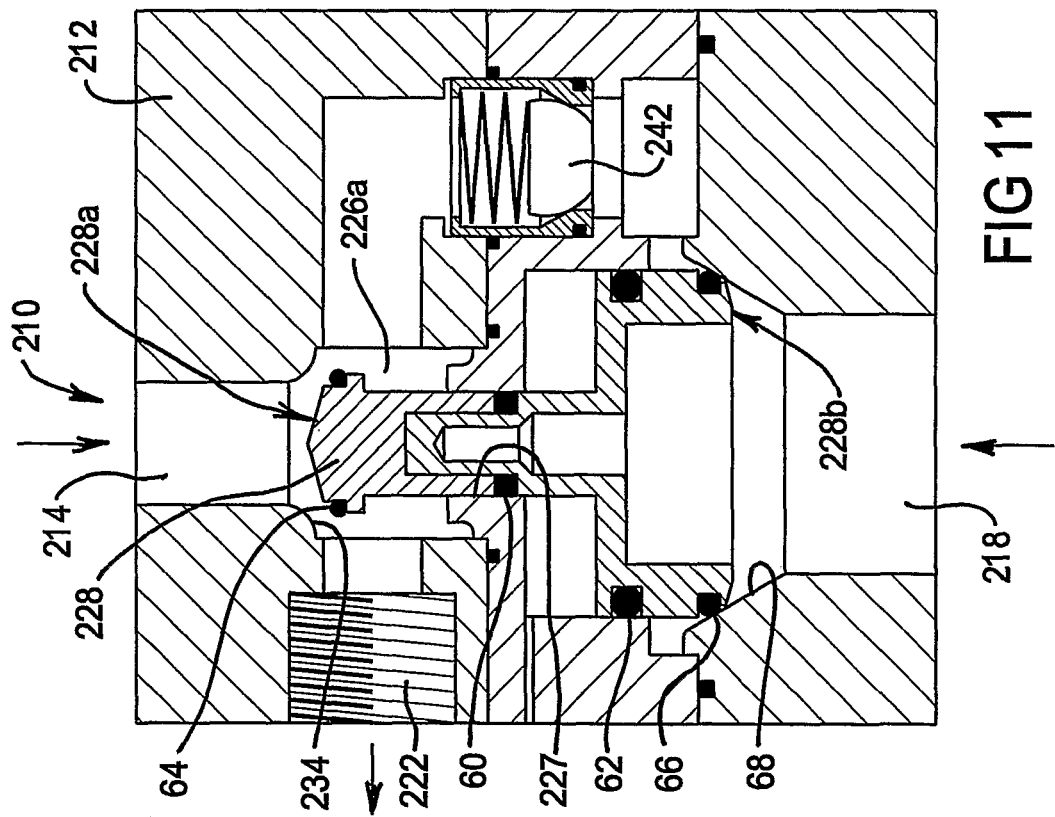

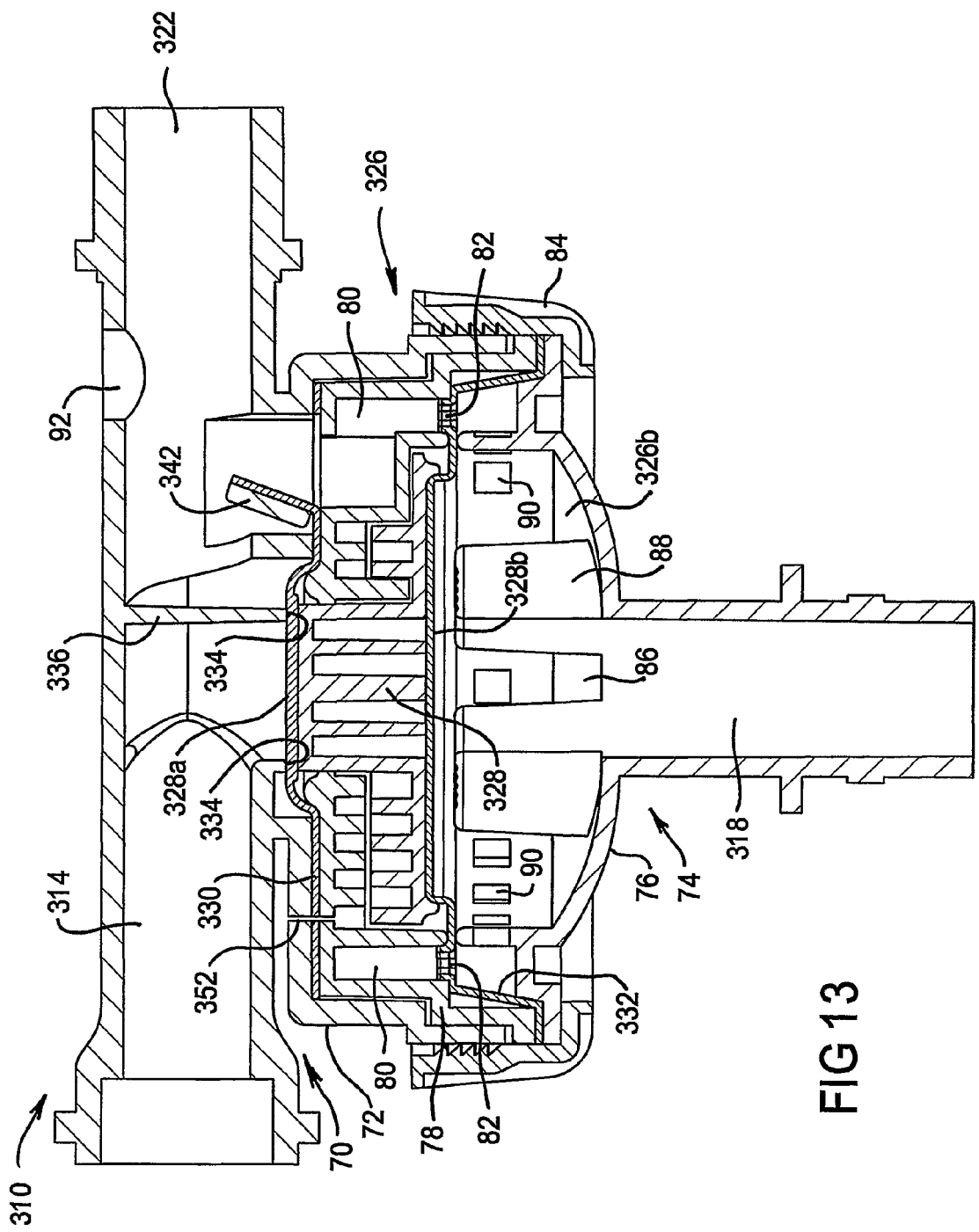

CONTROLLER, SYSTEM AND METHOD FOR PROVIDING SUPPLEMENTING WATER

The present invention claims priority from AU 2004904071 filed on 22 Jul. 2004 and entitled "Controller For Rainwater Harvesting System", the contents of which are incorporated herein in their entirety by reference.

BACKGROUND OF THE INVENTION

The present invention relates to a controller, system and method for providing a supplementing water supply to a main water supply. It may for example relate to a rainwater harvesting system for supplementing a mains water supply.

In co-pending Australian patent application AU-2003262296, there is disclosed a rainwater harvesting system in which a supply of mains water is able to be provided should the supply of lower pressure supplementing water from a rainwater tank be precluded. The switch to mains water may be necessary due to insufficient supplementing water being available, failure of a pump by which the supplementing water is supplied, or failure of the power source for the pump.

SUMMARY OF THE INVENTION

The present invention provides new controllers, systems and methods for switching between a main water supply and a supplementing water supply.

The present invention may be used in a similar manner to the systems of AU-2003262296, and the contents of AU-2003262296 are incorporated herein in their entirety by reference.

Viewed from one aspect, the present invention provides a supplementing water controller including a housing which defines a first flow passage having an inlet connectable to a main water supply; a second flow passage having an inlet connectable to a supplementing water supply that is at a pressure less than that of the main water supply; an outlet for each passage connectable to a water supply conduit; and an opening between the passages. The controller further includes a piston mounted for movement in the opening such that each of first and second opposite ends of the piston is exposed to pressure prevailing at the inlets to the first and second passages, respectively. At its first end, the piston is adapted to prevent flow along the first passage by sealing against a valve seat defined by the housing. Also, the effective surface area of the piston at the second end exceeds its area at the first end such that the piston is moved to provide a seal against the valve seat when the ratio of the areas at the first and second ends of the piston is less than the ratio of pressures prevailing at the inlets of the second and first passages. That is, the effective surface area of the piston at the second end exceeds its area at the first end such that the piston is moved to provide a seal against the valve seat when the product of the pressure and piston area at the first end is less than the product of the pressure and piston area at the second end.

The invention also provides a system for supplementing a main water supply, including a controller according to the present invention having the inlet of its first passage connected to a main water supply; a supply of supplementing water connected to the inlet to the second passage of the controller; and a conduit or conduits connecting the outlet from the first and second passages to an outlet device controllable by a consumer. The system further includes a sensor for detecting demand from a consumer at the outlet device; a sensor for detecting a sufficient presence of supplementing water at the supply thereof; a delivery device operable for delivering supplementing water from the supply thereof to the inlet to the second passage for flow through the controller to the outlet device; and a control unit for actuating the delivery device in response to detection of the demand and sufficient supplementing water. The delivery device is operable for delivering supplementing water at a pressure such that the product of the pressure and piston area at the first end, i.e. the main water supply end, of the piston of the controller is less than the product of the pressure and the piston area at the second end of the piston, i.e. the supplementing water end, whereby the piston is moved to prevent flow of water from the main water supply along the first passage by the first end of the piston sealing against the valve seat defined by the housing of the controller.

The first and second passages preferably have a common outlet defined by the housing of the controller. However, the housing may define a respective outlet for each passage, in which case the passages preferably are connected to a common conduit exteriorly of the housing.

In one embodiment, the piston is provided in a chamber located to the side of the first passage, with the piston movable laterally of the first passage. The chamber may be divided, at the opening in which the piston is movable, into a lower pressure region with which the second passage communicates and a higher pressure region with which the first passage communicates. Preferably, the valve seat is defined at an orifice which opens laterally from the first passage and through which the first passage communicates with the higher pressure region of the chamber. The lower pressure region of the chamber may be branched from the supplementing water passage, or may communicate with the water outlet so that the supplementing water flows through the lower pressure region when it is being delivered to the consumer.

The piston may have associated therewith at least one diaphragm which is movable with the piston. Thus, in the above described first embodiment, a diaphragm may be provided across or around the first end or the second end of the piston, or around a mid-portion of the piston. Preferably, a respective diaphragm is provided across or around each end of the piston. The or each diaphragm preferably provides a seal which precludes the flow of water through the opening in which the piston is movable.

The or each diaphragm may further divide the chamber in which the piston is provided. Where there are two diaphragms, one defines a surface of the lower pressure region while the other defines a surface of the higher pressure region, with there being an intermediate region between the higher and lower pressure regions. The intermediate region may, if required, be vented to the exterior of the housing.

The first and second passages may be arranged transverse to one another, and, in one embodiment, the piston moves transversely to the first passage in the plane defined by the two passages, and, in another embodiment, the piston moves transversely to the first passage transverse to the plane defined by the two passages.

In a further embodiment, the first and second passages are axially in line, with each defining a valve seat downstream from its inlet. In this embodiment, the piston is axially movable between the valve seats, with each end of the piston adapted for sealing against a respective valve seat in each of opposite extremes of its range of movement.

In this embodiment, the supplementing passage is sealed by the piston when water from the main water supply is being delivered. This prevents water from the main supply from entering the supplementing water supply, e.g. it prevents mains water from entering a rainwater tank.

In other embodiments, the controller may include a further valve arrangement for sealing the supplementing water supply during supply of water from the main supply. This may for example take the form of a one-way valve that seals the supplementing water passage under the pressure of the main water supply. In one embodiment, where a diaphragm is associated with the piston, the diaphragm may extend across the opening of the supplementing water supply passage, and may include a one-way valve, e.g. a flap, formed therein.

Instead of or in addition to a diaphragm, a seal, such as an O-ring seal, may be provided between the piston and the periphery of the opening in which the piston is movable. For example, a seal may be provided between an enlarged head portion of the piston at the second end and a surface defined by the housing around the enlarged head portion. A seal may also or alternatively be provided around a narrower head portion that provides the first end, and/or around a shaft portion of the piston between the two ends.

The present invention also provides a method of switching between a main water supply and a supplementing water supply, such that water from the supplementing supply is preferentially delivered to a consumer when it is available, the method including the steps of:

providing an interface between the consumer and the two supplies, the interface including a piston movable between a first position in which the main supply is blocked and a second position in which the main supply is delivered to the consumer, supplementing water being provided to the consumer when the piston is in the blocking position, wherein the pressure of the main water supply and of the supplementing water supply are applied respectively to a first effective area of the piston and a larger second effective area of the piston, and wherein the piston moves under the influence of water pressure acting on the two effective piston areas so as to move between the two piston positions.

The present invention has particular application where the main water supply is a mains supply provided by a utility company, and the supplementing supply is rainwater from a rainwater tank. The supplies may also however take other forms, and, for example, the main water supply could be sourced from bore water and the supplementing water could be sourced from a dam or from a recycled water supply. Thus, the present invention is applicable to any situation in which a supplementing water supply is preferred to be used but is not always available, in which case the present invention may allow the seamless supply of another water supply as a back-up.

Viewed from a further aspect, the present invention provides a water supply interface unit for connection between a primary water supply, a secondary water supply and a consumer network, the unit including:

an inlet passage for coupling to the primary water supply;

an inlet passage for coupling to the secondary water supply;

an outlet in fluid communication with the primary and secondary inlet passages for connection to the consumer network; and an actuator for blocking the main water supply to the outlet, the actuator having first and second effective areas that are exposed to the pressure of the primary and secondary water supplies respectively, the first area being smaller than the second area, such that on supply of secondary water below the pressure of the primary water supply but above a threshold pressure, the actuator is movable into a primary water supply blocking position.

The actuator, e.g. piston, may itself block the main water supply passage. It may also actuate another mechanism to block the main water supply passage, e.g. may connect to or activate a slide valve or the like provided across the passage.

The actuator may include a spring to assist in the balance of forces between the primary and secondary supply pressures, and for example, the spring force may provide a bias force that assists the secondary water pressure to move the actuator to block the primary water supply. The spring force may be adjustable, and the use of a spring may reduce or eliminate the need for differential effective areas of the actuator to which the two water pressures are applied.

The main water supply may include a pressure-reducing valve, so as to reduce the main water pressure. This can be useful where the main water pressure is particularly high, and where otherwise the pressure from the delivered supplementing water might not be sufficient to move the actuator/piston against the main water pressure. The pressure-reducing valve may reduce the main water pressure such that it is still higher than the pressure of the delivered supplementing water.

It should be noted that any one of the aspects mentioned above may include any of the features mentioned in relation to any of the other aspects mentioned above, as appropriate.

BRIEF DESCRIPTION OF THE DRAWINGS

Embodiments of the present invention will now be described, by way of example only, with reference to the accompanying drawings. It is to be understood that the particularity of the drawings does not supersede the generality of the preceding description of the invention.

In the drawings:

FIG. 1 is a sectional view through a controller according to a first embodiment of the invention;

FIG. 2 is a plan view of the controller of FIG. 1;

FIG. 4 corresponds to FIG. 1, but shows the controller in a second operating condition;

FIG. 5 is a sectional view through a controller according to a second embodiment of the invention;

FIG. 6 is a sectional view of the controller of the second embodiment taken in a plane normal to that of FIG. 5;

FIGS. 7 and 8 correspond to FIGS. 5 and 6, but show the controller of the second embodiment in a first operating condition;

FIGS. 9 and 10 correspond to FIGS. 5 and 6, but show the controller of the second embodiment in a second operating condition;

FIG. 11 is a sectional view through a controller according to a third embodiment, in which the controller is shown in a first operating condition;

FIG. 12 corresponds to FIG. 11, but shows the controller of the third embodiment in a second operating condition;

FIG. 13 is a sectional view through a controller according to a further embodiment, in which the controller is shown in a first operating condition;

DETAILED DESCRIPTION OF THE INVENTION

Figure 3:
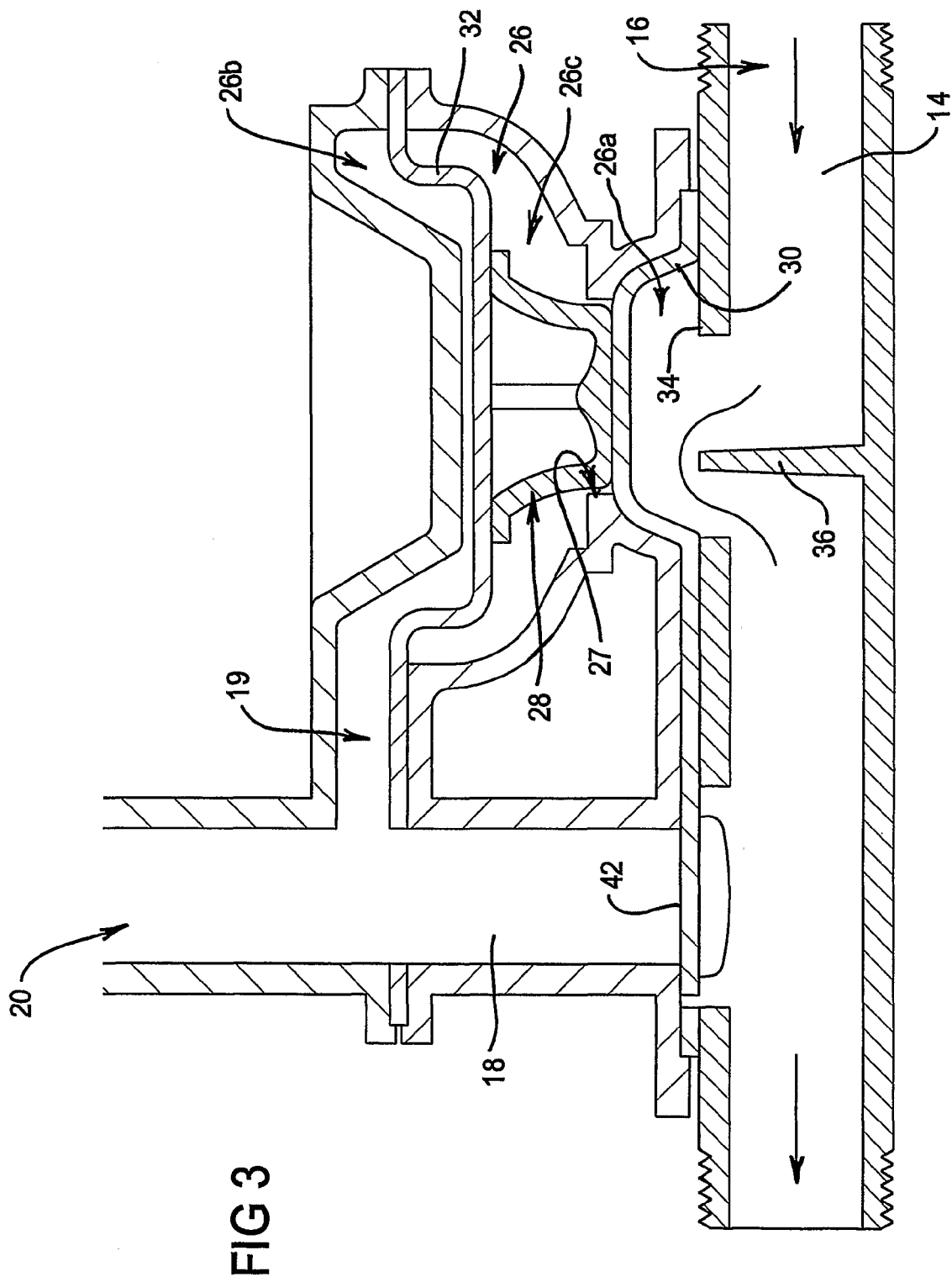
FIG. 3 corresponds to FIG. 1, but shows the controller in a first operating condition.

FIGS. 1 to 4 show a controller 10 that may be used to provide a consumer water supply by switching between a main (primary) water supply and a supplementing (secondary) water supply. For example, the controller 10 may deliver rainwater from a rainwater tank to a user in preference to mains water from a utility company, but will switch to the mains water automatically when rainwater cannot be supplied.

The water may be delivered to a single consumer device, e.g. to a lavatory or washing machine, and may be delivered to a consumer network that e.g. may connect to one or more water consuming devices. The controller 10 may provide a water supply for any suitable water need, including both non-potable and potable supplies.

Instead of mains water from a utility company, the primary or main water supply could be from for example a bore, whilst instead of rainwater, the supplementing water supply could originate from for example a dam or a source of recycled water.

The controller 10 has a housing 12 which defines a first passage 14 having an inlet 16, a second passage 18 having an inlet 20, and a common outlet 22 for passages 14 and 18. In the arrangement of controller 10, passage 18 communicates with passage 14 adjacent to outlet 22, with the passages 14 and 18 meeting in a T-configuration.

To the side of each of passages 14 and 18, housing 12 has a sub-housing 24 which defines a chamber 26. The chamber 26 opens to each of passages 14 and 18 through a respective orifice 15 and 19. Also, chamber 26 is constricted adjacent to orifice 15 to define a narrow opening or passage 27. A piston (actuator) 28 is provided in chamber 26 and is movable in opening 27 towards and away from orifice 15. The piston 28 is of circular cross-section and, at its first end nearer to passage 14, it has a smaller diameter cylindrical portion which has an end face 28a and is of a length enabling the required range of movement of piston 28 in opening 27. From that smaller diameter end, piston 28 flares to increase in diameter such that its end face 28b remote from passage 14 is larger than its end face 28a.

Across each of the smaller and larger end faces 28a and 28b of piston 28 there is provided a respective flexible diaphragm 30 and 32. Each diaphragm 30, 32 is clamped around its periphery between co-operating parts of housing 12. The diaphragms 30 and 32 divide chamber 26 into three portions. These include a higher pressure portion 26a with which passage 14 communicates through orifice 15, a lower pressure portion 26b with which passage 18 communicates through orifice 19, and an intermediate portion 26c around piston 28, between the diaphragms 30 and 32.

The range of movement of piston 28 enables orifice 15 to be sealed, to prevent the flow of water along passage 14. To enable this, a circular valve seat 34 is defined by part of the periphery of orifice 15 and a transverse partition wall 36 which is defined by housing 12 in passage 14 and which divides orifice 15. The size of end 28a of piston 28 and the material of which diaphragm 30 is made is such as to enable such a seal to be achieved at valve seat 34 when a sufficient pressure prevails in passage 18 and chamber portion 26b. When, as shown in FIG. 1, the piston 28 is retracted from valve seat 34, flow along passage 14 is able to divert out of, and then back into, passage 14 to pass between piston 28 and partition wall 36.

The controller 10 also includes a coupling 38 at inlet 16 to passage 14. This facilitates connection of housing 12 to a mains water supply (not shown). Coupling 38 contains dual check valves 38a which preclude a back-flow of water from controller 10 to the mains water supply.

Additionally, at outlet 22, controller 10 has a coupling 40 which facilitates connection of housing 12 to an outlet device (not shown) controllable by a consumer. The coupling 40 houses a flow switch sensor 40a able to provide an output signal indicative of a consumer's demand for water supply from the outlet device.

At the junction of passages 14 and 18, there is a non-return valve 42 disposed across passage 18. In the arrangement shown, valve 42 is a flexible flap provided as an extension of diaphragm 30, but such an arrangement may be substituted by any suitable one-way valve.

In use of controller 10, a main water supply (e.g. a mains supply provided by a utility company) is connected to coupling 38, while a source of supplementing water (e.g. rainwater stored in a rain tank) is connected to inlet 20 of passage 18, and outlet 22 is connected to an outlet device controllable by a consumer.

Supplementing water may be supplied to controller 10 under the action of a pump (not shown) operable to supply the water at a suitable pressure. The pump is operated subject to a supply sensor (not shown) detecting a sufficient supply of supplementing water (e.g. a float sensor, pressure sensor or the like that monitors the amount of water in the rain tank), and also subject to there being a user demand, as indicated by the flow sensor 40a.

FIG. 3 shows controller 10 operating to supply mains water pressure in response to a consumer's demand being sensed by sensor 40a. This occurs in response to consumer demand when a supply sensor (not shown) detects an insufficient supply of supplementing water or where, despite a sufficient supply, the pump is not operable (e.g. due to a malfunction or lack of power). In this situation, the pressure of the supplied mains water is sufficient to hold piston 28 away from valve seat 34, and to hold one-way valve 42 closed to prevent flow of mains water to the supplementing water source.

FIG. 4 shows controller 10 operating to supply supplementing water. This necessitates the sensing of a consumer demand, and also the supply sensor detecting a sufficient supply of supplementing water. It further necessitates the pump being operable to supply supplementing water at a pressure above a threshold level, such that when acting against the area of end 28b of piston 28, the supplemental water pressure provides a force greater than that resulting from the mains pressure acting against smaller end 28a of piston 28. This occurs when the ratio of the supplementing pressure to the mains pressure is greater than the ratio of the area at end 28a to the area at end 28b. Thus, pressure at end 28b of piston 28 resulting from the supply of supplementing water moves the piston so that its end 28a seals against valve seat 34 and prevents supply of mains water. Also, as mains pressure has been removed, the pressure of the supplementing water opens one-way valve 42, enabling the consumer's demand to be met by the supply of supplementing water.

The second embodiment of FIGS. 5 to 10 generally will be understood from the description of controller 10 of FIGS. 1 to 4. Corresponding parts therefore have the same reference numerals plus 100. Also, description of controller 110 largely will be limited to matters of difference.

The controller 110 has a form indicative of its housing 112 having been made from three machined components. The first passage 114 terminates at the high pressure portion 126a of chamber 126, with piston 128 movable towards and away from an end portion of passage 114 in an in-line relationship. Thus, valve seat 134 is defined at the end of passage 114.

The second passage 118 extends at right angles to passage 114. The passage 118 is in communication with portion 126a of chamber 126 via orifice 119 to allow for the supply of water from the mains supply passage 114 via the chamber portion 126a and the second passage 118 to the outlet 122.

The second passage 118 communicates with the low pressure portion 126b of chamber 126 via a connecting passage 50 located upstream of the one-way valve 142. To facilitate movement of piston 128, portion 126c of chamber 126 is vented to atmosphere via passage 52.

FIGS. 5 and 6 show controller 110 in its as supplied and no-flow conditions. When, as in FIGS. 7 and 8, controller 110 is operable to supply mains pressure water in response to a consumer's demand, the water pressure at inlet 116 of passage 114 opens one-way valve 138a against the bias of its return spring. The mains water holds piston 128 away from valve seat 134, to enable the mains water to flow via chamber portion 126a to passage 118, and to open check valve 54 to enable the water to flow to an outlet device via outlet 122. The pressure holds one-way valve 142 closed.

When controller 110 is operable to supply supplementing water, it is in the condition shown in FIGS. 9 and 10. The supplementing water enters passage 118 via inlet 120, and flows via passage 50 into the low pressure chamber portion 126b. The pressure of water acting on the large end face 128b of piston 128 forces the piston to a position in which its end 128a seals against valve seat 134. The pressure in passage 118 then is able to move one-way valve 142 against the bias of its spring, and to open valve 54 to enable supplementing water to flow to an outlet device via outlet 122.

The valve 54 is a pump check valve and provides a demand sensor function also. The valve 54 includes a magnetic element 54a that is sensed by "no flow" and "flow" proximity sensors 56 and 58. Thus, when sensor 56 senses the element 54a, there is no consumer demand, and when sensor 58 senses the element 54a, there is consumer demand (i.e. a water-using device has been operated and is drawing water).

The embodiment of FIGS. 11 and 12 largely can be understood from the description of the first and second embodiments of controllers 10 and 110. Parts corresponding to controller 10 have the same reference numeral plus 200.

The controller 210 does not have diaphragms. Rather, piston 228 achieves a substantially fluid tight seal by provision of a seal 60, e.g. an O-ring seal, within passage 227, and a seal 62, e.g. an O-ring seal, between the enlarged head of piston 228 and a surface of housing 212 around the enlarged head. Also, piston 228 is axially movable in line with passage 214 and passage 218. A seal 64 around end face 228a of piston 228 is able to provide a seal against valve seat 234, while a similar seal 66 around end face 228b of piston 228 is able to seal against a valve seat 68 at the inner end of passage 218.

FIG. 11 shows controller 210 operable for supply of mains pressure water, due to an insufficient supplementing water supply or pump failure. In this condition, piston 228 is moved to seal against seat 68, enabling mains water to flow from passage 214 to outlet 222, via chamber portion 226a. The mains pressure holds one-way valve 242 closed against flow of mains water to the supplementing water system.

As shown in FIG. 12, supply of supplementing water forces the piston to seal against seat 234, after which the pressure of supplementing water opens valve 242 against the bias of its spring. Supplementing water then is able to flow through valve 242, chamber portion 226a and outlet 222.

Figure 14:
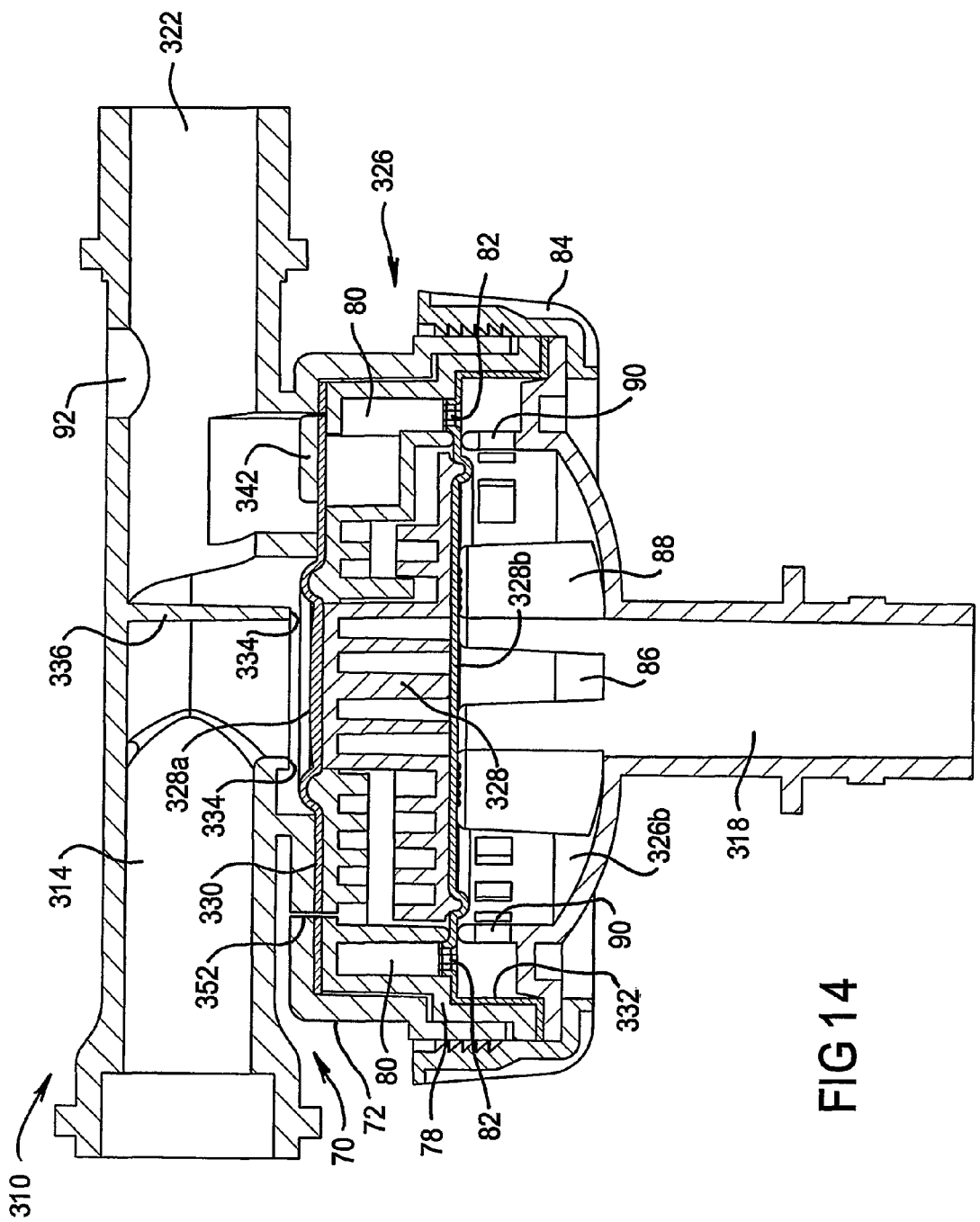
FIG. 14 corresponds to FIG. 13, but shows the controller in a second operating condition.

A further embodiment is shown in FIGS. 13 and 14, with parts corresponding to controller 10 having the same reference numeral plus 300.

The controller 310 of this embodiment is similar to that of FIGS. 1 to 4, but, in this case, the supplementing water flows through the low pressure chamber portion 326b. Also, the piston 328 has a stepped rather than a tapered form, and the sub-housing for the piston chamber 326 is of different construction.

The controller 310 has a first housing portion 70 which defines the main passage 314, the outlet 322 and a first housing part 72 of the piston chamber 326. The controller 310 also has a second housing portion 74, which defines the supplementing water passage 318 and a second housing part 76 of the piston chamber 326. An intermediate chamber housing part 78 is provided between the first and second chamber housing parts 72 and 76, and defines a guideway for the piston 328 and an annular channel 80 for connecting the low pressure chamber 326b with the outlet 322. The second diaphragm 332 has a plurality of holes 82 about its periphery that allow for fluid communication between the lower pressure chamber 326b and the channel 80. The first and second chamber housing parts 72 and 76, the intermediate part 78 and the diaphragms 330 and 332 are held together by a collar 84 that screws onto the first housing part 72.

As shown in FIG. 13, when supplementing water is delivered to a consumer by activation of the supplementing water pump, the supplementing water from the supply passage 318 enters the low pressure chamber portion 326b via apertures 86 between diaphragm support walls 88 and forces the piston 328 to seal on the valve seat 334. The water then flows through openings 90 in the sidewall of the low pressure chamber portion 326b and through the openings 82 in the low pressure diaphragm 332 into the annular channel 80 from where it passes through the one-way valve 342 formed in the high pressure diaphragm 330 to the outlet 322.

As shown in FIG. 14, when supplementing water is unable to be delivered, the piston 328 is moved off of the circular valve seat 334, until it is stopped by the support walls 88, and mains water flows over partition/baffle 336, seals one-way valve 342 and passes to outlet 322. A vent 352 facilitates movement of the piston 328 in the chamber 236.

Also shown in FIGS. 13 and 14 is an orifice 92 in the outlet passage 322. This orifice may house a flow sensor (not shown) for monitoring user demand. The flow sensor may by of a kind that determines flow or flow rate by including a heating element upstream of a temperature sensor and by determining changes in the temperature sensed due to changes in water flow. A suitable flow sensor may for example be as described in AU 2002333031 or WO 91/19170, the contents of which are incorporated herein by reference in their entirety.

Figure 15:
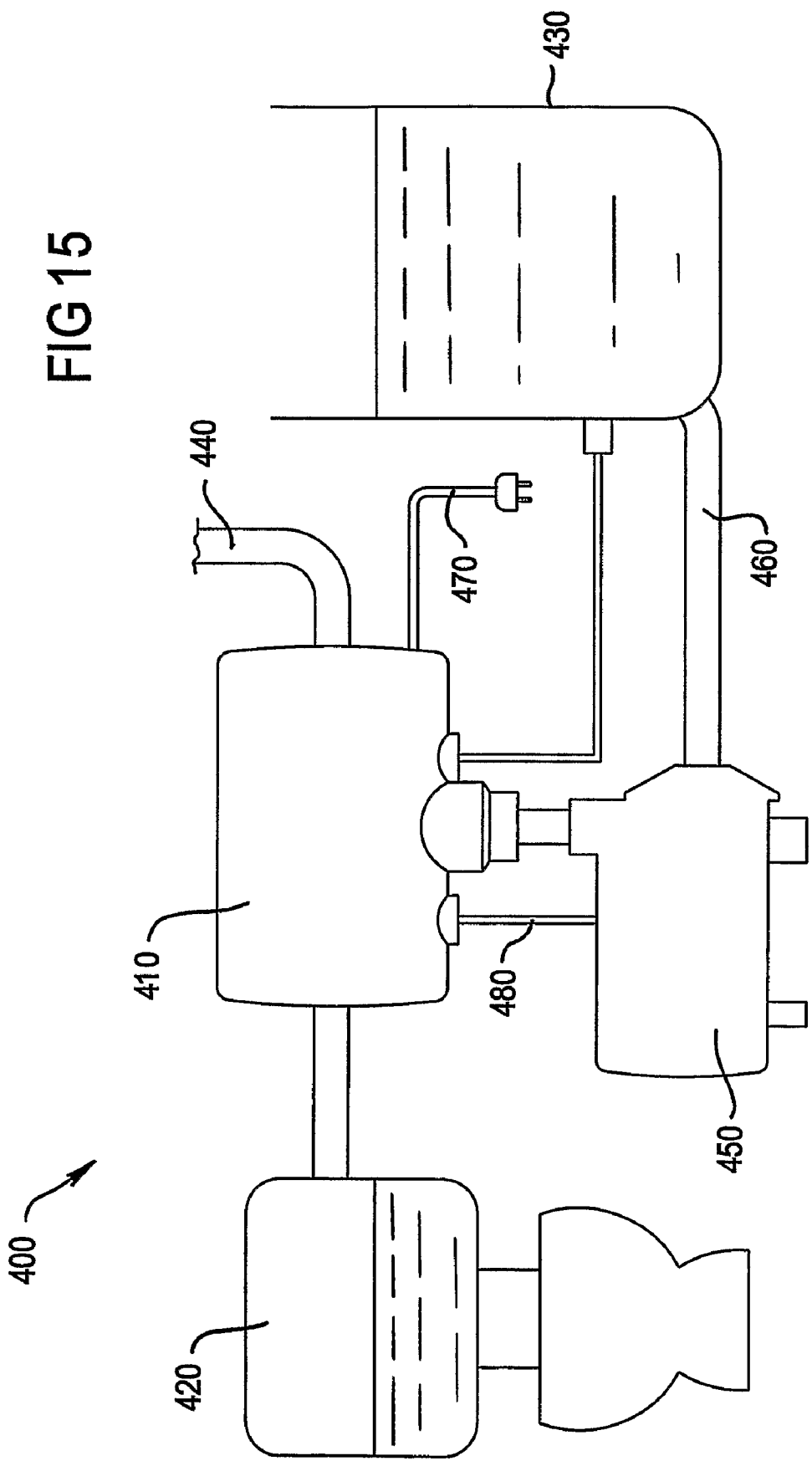
FIG. 15 is a schematic of a water supply system in which the controllers of the present invention may be used.

FIG. 15 shows schematically an overall rainwater harvesting system 400 according to an embodiment of the present invention in which a controller 410 supplies water to for example a lavatory cistern 420 preferentially from a rainwater tank 430, and, as a back-up, from a mains water supply pipe 440.

The controller 410 may take the form of any one of the controllers 10, 110, 210, or 310, and also includes a control unit, e.g. suitable circuitry such as a relay device, for actuating a pump 450 that is mounted in the rainwater tank pipe 460 for delivering rainwater under pressure to the consumer. Thus, the controller 410 receives power from the mains electricity supply 470, and includes a power lead 480 for energising the pump 450.

The system may work in a similar manner to the systems described in AU-2003262296, and the controller 410 may receive a signal from for example a rainwater sensor 490 to indicate whether or not there is sufficient rainwater to fulfil demand. The controller 410 combines this signal with a customer demand signal e.g. as provided by sensors 40a or 56 and 58 in the controller 410. If the sensors indicate that there is consumer demand and sufficient rainwater, then the controller 410 will power the pump 450. The pressure of the rainwater supply will then move the piston/actuator of the controller 410 to block the mains supply and allow for delivery of the rainwater supply to the cistern 420.

Should there be insufficient rainwater to adequately fulfil demand, then the controller 410 will not energise the pump 450, and the rainwater supply pressure will be insufficient to move the piston/actuator to block the mains supply. Accordingly, mains water will be delivered to the cistern 420. This will also occur if the pump fails or if there is a power failure, as in each case the pump will not pressurise the rainwater supply, and the mains supply will remain unblocked.

The changeover between supplies will occur seamlessly, and may occur midway in a supply cycle, e.g. halfway through filling the cistern. As in AU-2003262296, the pump may be activated only if demand is above a threshold value. This can prevent the pump from being actuated when there is a leak or where there is only a slow delivery of water, such as at the end of the cistern refill, where the cistern float valve is only partially open. The use of mains water in such situations reduces pump usage, and can reduce pump wear, noise and operating costs.

The present invention may be implemented in new water supply systems or may be retrofitted to existing supplies. Such systems provide a failsafe to the main supply during pump failures and power outages. They require no air gap in the supply, and do not require use of the pump to supply mains water. They have application in both domestic and industrial supplies. They allow the supply of lower pressure secondary supplies of water to block the primary supply in a simple, efficient and robust manner.

In further embodiments of the controller, it would be possible to combine the use of diaphragms and o-ring seals. It would also be possible to vary the configuration of the supply and outlet pipes and the positioning and form of the piston chamber. Also, the piston/actuator need not act directly to block the main flow, but could actuate some other mechanism to do this (and also to block off the supplementing supply when necessary). Other type of valve arrangements could also be used, for example a slide valve could be used to block the main flow.

In other embodiments a spring, e.g. a coiled spring, could also be applied to the piston/actuator so as to supplement the forces acting on it. For example, the spring force could assist the supplementing water pressure in closing the main supply valve. The spring force could be adjustable, so that the overall balance of the piston forces may be adjusted for a particular situation. It would also be possible to provide sufficient spring force, such that the differential piston areas are unneeded, as the spring and pressurised supplementing water forces could be large enough in themselves to overcome the main water supply pressure.

In further embodiments, e.g. where the supply of main water is of a particularly high pressure, the main supply may be provided with a pressure-reducing valve, such as in AU-2003262296. This may reduce the pressure sufficiently so that the pressure of the supplementing valve (with the assistance of the differential actuator/piston effective areas, and possibly a spring bias) is able to overcome that of the main water supply, so as to move the actuator to a main supply blocking position.

It is to be understood that various alterations, modifications and/or additions may be introduced into the constructions and arrangements of parts previously described without departing from the spirit or ambit of the present invention, and that, in the light of the above teachings, the present invention may be implemented in a variety of manners as would be understood by the skilled person.

The invention claimed is:

1. A supplementing water supply controller, the controller including:
   a housing defining a first flow passage having an inlet connectable to a main water supply, a second flow passage having an inlet connectable to a supplementing water supply at a pressure less than the pressure of the main water supply, and a common outlet for said first and second flow passages which is connectable to a water supply conduit, the housing further defining a chamber which has an opening to the first flow passage and an opening to the second flow passage; and
   an actuator mounted for movement in the chamber by two diaphragms, wherein one diaphragm is associated with a first end of the actuator and the second diaphragm is associated with the second opposite end of the actuator,
   wherein in use the first end of the actuator with its associated diaphragm is exposed via the opening to the first flow passage to pressure prevailing at the inlet to the first flow passage, and the second opposite end of the actuator with its associated diaphragm is exposed via the opening to the second flow passage to pressure prevailing at the inlet to the second flow passage,
   wherein the actuator at its first end with its associated diaphragm is adapted to prevent flow along the first flow passage by sealing against a valve seat defined by the housing, and wherein a surface area of the actuator and its associated diaphragm at the second opposite end exceeds a surface area of the actuator and its associated diaphragm at the first end such that the actuator is moved for a seal to be provided against the valve seat when the ratio of said surface areas at the first and second opposite ends of the actuator is less than the ratio of pressures prevailing at the inlets of the second and first flow passages.

2. The controller of claim 1, wherein
   the outlet includes a flow sensor for sensing water flow as consumer demand; and
   a control unit is associated with the housing, the control unit including circuitry for actuating a supplementing water delivery device to supply the supplementing water to the outlet when the control unit senses a consumer demand via the flow sensor in the outlet.

3. The controller of claim 2, wherein the control unit receives a signal from a supplementing water sensor that senses the amount of supplementing water available, and actuates the supplementing water delivery service to supply the supplementing water to the outlet when the control unit senses a consumer demand via the flow sensor in the outlet and a sufficient amount of supplementing water.

4. The controller of claim 1, wherein the chamber within which the actuator is provided is located to the side of the first flow passage, with the actuator movable laterally of the first flow passage.

5. The controller of claim 1, wherein the first and second flow passages each include a valve seat downstream from its inlet, and wherein the actuator is movable between the valve seats, with each of the first and second opposite ends of the actuator with the respective diaphragms adapted for sealing against a respective valve seat.

6. The controller of claim 1, wherein the chamber within which the actuator is provided is divided into a lower pressure region with which the second flow passage communicates and a higher pressure region with which the first flow passage communicates.

7. The controller of claim 6, wherein the valve seat is defined at an orifice which opens laterally from the first flow passage and through which the first flow passage communicates with the higher pressure region of the chamber.

8. The controller of claim 1, wherein the second opposite end of the actuator with its associated diaphragm defines a surface of a lower pressure region and the first end of the actuator with its associated diaphragm, defines a surface of a higher pressure region, with an intermediate region between the higher and lower pressure regions.

9. The controller of claim 8, wherein the intermediate region is vented to the exterior of the housing.

10. The controller of claim 1, wherein a one-way valve is included in the second flow passage for sealing the second flow passage from the first flow passage when the controller is delivering the main water supply.

11. The controller of claim 1, wherein the diaphragm associated with the first end of the actuator extends across the second flow passage, and includes a one-way valve therein.

12. A system for supplementing a main water supply, including:
   a controller according to claim 1;
   a main supply of water connected to the inlet of the first flow passage of the controller;
   a supplementing water supply connected to the inlet to the second flow passage of the controller;
   one or more conduits connected to the outlet from the first and second flow passages for connection to an outlet device controllable by a consumer;
   a supplementing water sensor for detecting a sufficient presence of supplementing water at the supply thereof;
   a supplementing water delivery device operable for delivering supplementing water from the supply thereof to the inlet to the second flow passage for flow through the controller to the outlet;
   wherein the control unit actuates the supplementing water delivery device in response to detection of consumer demand via the flow sensor in the outlet and sufficient supplementing via the supplementing water sensor; and
   wherein the supplementing water delivery device is operable to deliver supplementing water at a pressure such that the product of the pressure and effective surface area of the actuator with its associated diaphragm at its first end is less than the product of the pressure and the effective surface area of the actuator with its associated diaphragms at its second opposite end whereby the actuator is moved to prevent flow of water from the main supply along the first flow passage by the first end of the actuator with its associated diaphragm sealing against the valve seat defined by the housing of the controller.

* * * * *